(12) United States Patent
Johnson et al.

(10) Patent No.: US 7,021,245 B2
(45) Date of Patent: Apr. 4, 2006

(54) AUTOMOTIVE TETHER DEVICE

(75) Inventors: Lawrence W. Johnson, Taylor, MI (US); Jeffrey A. Cronk, White Lake, MI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 11/002,505

(22) Filed: Dec. 2, 2004

(65) Prior Publication Data

US 2005/0217608 A1    Oct. 6, 2005

Related U.S. Application Data

(60) Provisional application No. 60/558,697, filed on Apr. 1, 2004.

(51) Int. Cl.
*A01K 1/04* (2006.01)
*B62C 11/00* (2006.01)

(52) U.S. Cl. .................. 119/795; 119/786; 119/788; 280/187; 248/910

(58) Field of Classification Search ............ 280/187; 248/910; 119/795, 786, 788, 769, 780, 791, 119/756, 787
See application file for complete search history.

(56) References Cited

U.S. PATENT DOCUMENTS

| | | | | | |
|---|---|---|---|---|---|
| 450,633 | A | * | 4/1891 | Motter | 242/379 |
| 582,702 | A | * | 5/1897 | Snell | 242/379 |
| 704,730 | A | * | 7/1902 | Zierleyn | 119/769 |
| 753,835 | A | * | 3/1904 | Albee | 119/769 |
| 762,439 | A | * | 6/1904 | Reddish | 119/769 |
| 800,260 | A | * | 9/1905 | Bellstedt | 119/769 |
| 843,543 | A | * | 2/1907 | Matsumoto | 119/769 |
| 1,738,581 | A | * | 12/1929 | Hodgson | 119/770 |
| 3,751,031 | A | * | 8/1973 | Yamauchi | 482/105 |
| 5,456,214 | A | * | 10/1995 | Quilling | 119/795 |
| D398,085 | S | * | 9/1998 | Gallo | D30/154 |
| 5,870,974 | A | * | 2/1999 | Johnson | 119/786 |
| 6,435,137 | B1 | * | 8/2002 | Hourihan | 119/788 |
| 6,499,436 | B1 | * | 12/2002 | Capperrune | 119/792 |
| 6,578,528 | B1 | * | 6/2003 | Brown | 119/769 |
| 6,745,722 | B1 | * | 6/2004 | Quilling | 119/795 |

\* cited by examiner

*Primary Examiner*—Yvonne R. Abbott
(74) *Attorney, Agent, or Firm*—Paul F. Donovan; Mark W. Croll

(57) ABSTRACT

An automobile tether device includes a base and a loop spanning the base and rotatable relative to the base. The base defines cutouts for receiving end segments of the loop. The loop frictionally engages the surface on which the tether device is installed to allow the loop to be positioned at elevations relative to the base.

21 Claims, 1 Drawing Sheet

AUTOMOTIVE TETHER DEVICE

CROSS-REFERENCE TO RELATED APPLICATIONS

The present regular United States patent application claims the benefits of U.S. Provisional Application Ser. No. 60/558,697 filed Apr. 1, 2004.

FIELD OF THE INVENTION

The present invention relates to tether devices and, more particularly, to tether device anchors installed in automobiles to tie down accessories installed in the automobile, such as child restraints or seats.

BACKGROUND OF THE INVENTION

State laws require the use of child restraints in automobiles. Seat belts and shoulder harnesses provided in the automobile are configured and arranged for young adults and adults, but do not work well with small children and infants. Infant carriers, infant seats and child booster seats are widely available for installation in automobiles to properly restrain infants and young children. A typical procedure for installing a child restraint includes fastening a vehicle seat belt through structure of the child restraint and connecting a tether strap from the top of the child seat to a tether strap anchor installed in the automobile.

The rapid growth of young children can result in a child outgrowing a child restraint in a relatively short period of time. The child may rapidly progress from an infant carrier to an infant seat and subsequently a child booster seat, requiring periodic removal of the old restraint designed for a smaller child and installation of a new, properly sized restraint. Further, in multiple car families one vehicle is often primarily used for transporting the children, and child restraints will be installed in it. However, on occasion it may be necessary to transport children in the other vehicles. Rather than having child restraints installed in both, the restraints are merely transferred from one vehicle to another.

Since the typical child restraints require the use of a tether strap as noted above, automobile manufacturers are known to provide tether strap anchors securely installed in appropriate locations in new automobiles. Alternatively, automobile owners may install the anchors in several automobiles so that the child restraints can be quickly transferred from one vehicle to another without having to move the anchor from one automobile to another. Anchors of this type also can be used for cargo nets and other devices provided as standard equipment or as optional accessories in automobiles.

A known design for a tether anchor strap anchor includes a frame having an edge formation to hold a loop secured therein. A bolt through the bracket secures the bracket to the automobile. The loop can be rotated from a position in which the outer portion of the loop lays substantially flat against the bracket to positions elevated from the bracket. A spring is operatively associated with the loop and frame to provide torque resistance to rotation of the loop so that it will stay in elevated positions more readily accessible for attachment of the tether strap.

Known tether strap anchors have deficiencies, including higher than desired costs to manufacture and assemble. Further, with the loop attached to the bracket at one edge, if sufficient force is applied against the loop by the tether strap at certain angles, the bracket can be pulled past the head of the bolt securing the bracket to the automobile.

What is needed in the art is a tether strap anchor that is inexpensive to manufacture and easy to assemble, with fewer parts than known designs, and that anchors securely in its installed position and remains sturdy during use.

SUMMARY OF THE INVENTION

The present invention provides a tether anchor having a loop engaging a base at two locations, and configured to provide inherent resistance to rotation of the loop, allowing positioning of the loop.

In one aspect thereof, the present invention provides an automobile tether anchor with a base including a peripheral edge. The base defines a hole for receiving a fastener. First and second cutouts in the base each have an opening thereto in the edge. A loop spans the base and has end segments secured in the cutouts.

In another aspect thereof, the present invention provides an automobile tether device for installation on a surface, with a base including a platform and a depending side having a peripheral edge for engaging the surface. The platform defines a hole for receiving a fastener. First and second cutouts are provided in the depending side on opposite sides of the hole. A loop spans the base and has end segments secured in the cutouts. The end segments are configured to frictionally engage the surface upon rotation of the loop relative to the base.

In a still further aspect thereof, the present invention provides an anchor with a base defining a hole for frictionally engaging a fastener inserted therein. A loop spans the base and has end segments secured in the base on substantially diametrically opposite sides of the hole. The end segments are configured to provide selected resistance to rotation of the loop relative to the base.

An advantage of the present invention is providing a tether anchor that is inexpensive to manufacture and easy to assemble.

Another advantage of the present invention is providing a tether anchor that is easy to install and sturdy in use.

A still further advantage of the present invention is providing a tether anchor that is both aesthetically pleasing in appearance, and functional in use.

Other features and advantages of the invention will become apparent to those skilled in the art upon review of the following detailed description, claims and drawings in which like numerals are used to designate like features.

Figure 1:
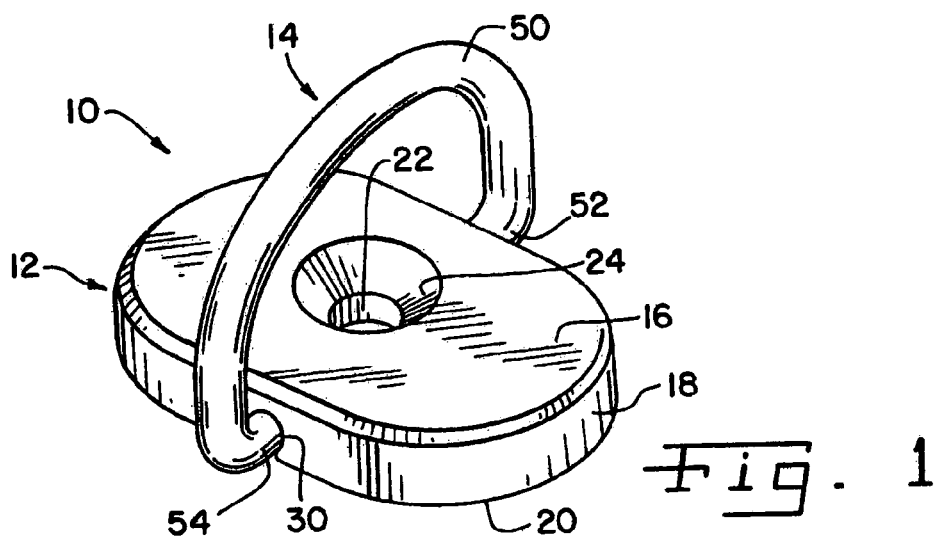
FIG. 1 is a perspective view of a tether device in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a tether strap anchor in accordance with the present invention. Tether anchor 10 can be installed in an automobile or other structure to provide a readily accessible anchor for attaching straps and the like from devices such as child restraints or other automobile accessories. The present invention is believed to have particular utility when used in automobiles for attaching tether straps from child seats, but also can be used for attaching other items and things, such as cargo nets and other accessories. Further, a tether anchor 10 of the present invention may have use for installation in other things than automobiles. Further, while depicted of a certain overall configuration and relative proportional size, it should be understood that the present invention can be provided in a variety of basic sizes, shapes and configurations without departing from the scope of the present invention. Thus, the present invention is adaptable for use in a variety of installations and can provide outward appearances pleasing and consistent within the environment in which it is used.

Anchor 10 includes a base 12 and a loop 14. Loop 14 is rotatably connected to base 12 as will be described in greater detail hereinafter. Base 12 provides the structure for securing tether anchor 10 in the installation in which it is used, and loop 14 provides the structure by which a tether strap (not shown) or other item can be secured to anchor 10. For example, a snap hook or other implement (not shown) can be connected to and disconnected from loop 14 as required.

Anchor 10 including both base 12 and loop 14 can be made of metal, such as steel or strong plastics and other suitable materials for the installation in which it is used. High strength spring steel is a suitable material.

Base 12 is a single piece, monolithic structure formed by stamping or metal drawing. Base 12 has a somewhat cupped configuration, with a platform 16 surrounded by a depending side 18 having a peripheral edge 20 engaging the surface on which tether anchor 10 is installed. Base 12 defines a hole 22, substantially centrally located in platform 16, for receiving a bolt or other fastener (not shown) used to secure tether anchor 10 to the surface on which it is installed. Hole 22 is defined by a tapered angular lead in surface 24 from platform 16 and a cylinder 26 extending beyond platform 16. The head and upper portion of the shank of a bolt or other fastener (not shown) fits within the countersink formed by tapered lead in surface 24 and cylinder 26 so that the head can be flush mounted with the top surface of platform 16.

First and second cutouts 28 and 30 are provided at opposed positions along side 18. Cutouts 28 and 30 have narrowed openings 32 and 34, respectively at peripheral edge 20, and are enlarged inwardly from openings 32, 34. Cutouts 28 and 30 receive and retain anchor loop 14, allowing rotation of loop 14 relative to base 12.

Loop 14 has an arcuate portion 50 spanning base 12, and end segments 52, 54 secured in cutouts 28 and 30. Enlargements 56 and 58 are provided at distal ends of end segments 52, 54.

Arcuate portion 50 extends from one side of base 12 to the other side of base 12. Arcuate portion 50 and can be of a variety of configurations and shapes, such as substantially oblong with a rounded apex as shown in the exemplary embodiment, semicircular, angular to define a peak at the apex, or the like. While shown as being substantially round in cross-section, arcuate portion 50 can have other cross-sectional shapes, including rectangular shapes. The size and shape of portion 50 can be selected depending on the size and shape of base 12, the desired size and shape of the opening defined by loop 14 or other functional and aesthetic factors.

First and second end sections 52, 54 extend inwardly toward each other from arcuate section 50 and are received and retained in cutouts 28, 30. Narrowed openings 32, 34 of cutouts 28, 30 receive end sections 52, 54 in a snap-fit type engagement. Flattened areas 60, 62 are provided by coining or machining on end sections 52, 54, to facilitate insertion of end sections 52, 54 through openings 32, 34 and into cutouts 28, 30. End sections 52, 54 have a major thickness along a diameter substantially parallel to flattened areas 60, 62 and a minor thickness normal to flattened areas 60, 62. By positioning loop 14 with the minor thickness of end sections 52 and 54 confronting openings 32, 34 a lessened degree of resistance is provided for passing end sections 52, 54 through openings 32, 34.

Figure 2:
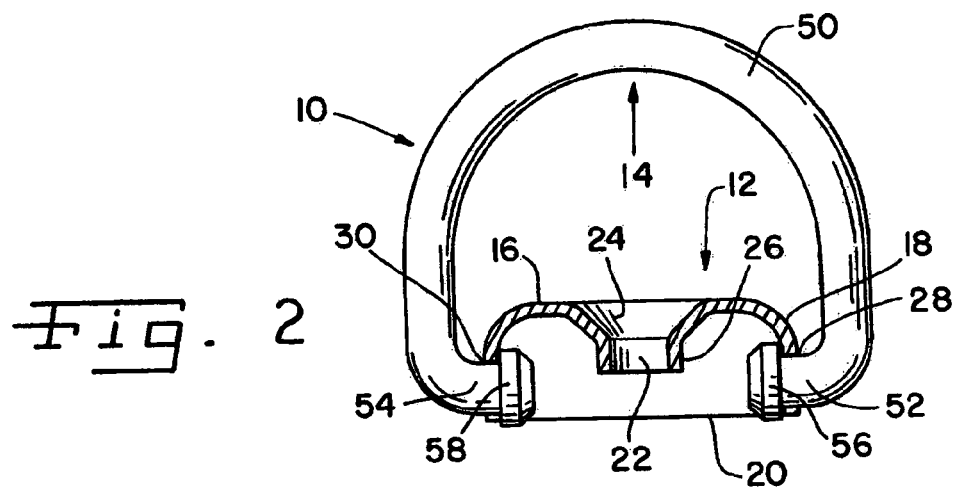
FIG. 2 is a cross-sectional view of the tether device shown in FIG. 1.

Enlargements 56, 58 on the distal ends of end sections 52, 54, respectively, are of larger diameter than cutouts 28, 30 and prevent end sections 52, 54 from being withdrawn axially from cutouts 28, 30. As best seen in FIG. 2, enlargements 56 and 58 are of sufficient size to extend past peripheral edge 20. As a result, with anchor 10 installed on a surface, such as a carpeted or upholstered surface of an automobile, enlargements 56, 58 provide torque resistance to rotation of loop 14. Thus, loop 14 can be elevated from a flat position to an extended position as shown in FIG. 2 and will remain in position to facilitate connection of a tether strap or other device. The resistance to rotation provided by enlargements 56 and 58 held against a surface on which anchor 10 is installed also reduces free rotation of loop 14 when a tether strap or other device is not connected thereto. Rattling and other noise from vibrations and movements of an automobile with an anchor 10 of the present invention are less reduced. The distances by which enlargements 56, 58 extend beyond edge 20 in conjunction with the type of surface on which anchor 10 is installed are selected to provide the desired resistance to rotation of loop 14 relative to base 12. Configuring enlargements 56, 58 in this manner eliminates the need for a spring or other device to provide the same features, making anchor 10 less costly to manufacture and easier to assemble.

Figure 3:
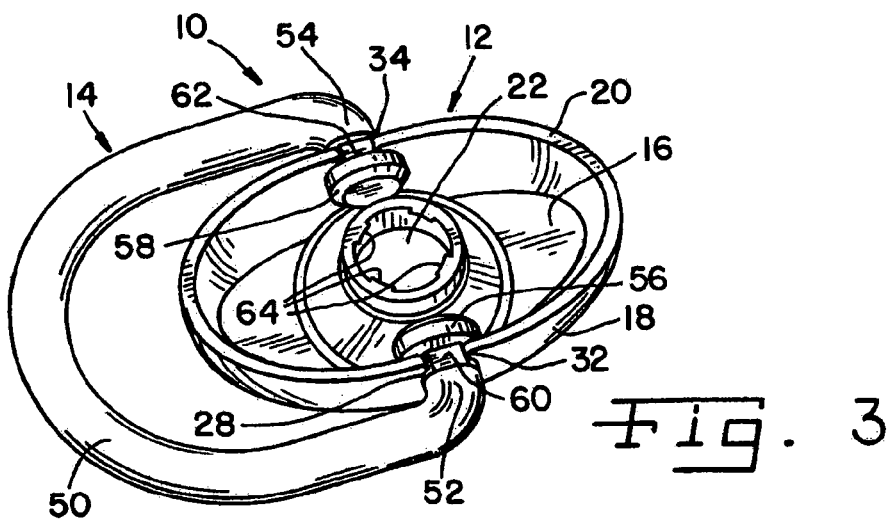
FIG. 3 is a perspective view of the bottom of the tether device.

FIG. 3 further illustrates an advantageous feature of the present invention in which cylinder 26 is provided with one or more inwardly projecting tab 64 to narrow the diameter of cylinder 26 at the location of tab or tabs 64. Tabs 64 frictionally engage a bolt or other fastener (not shown) inserted in hole 22. Thus, tether anchor 10 can be pre-assembled with an appropriate fastener and can be shipped with the fastener in place. Installation of anchor 10 in an automobile is facilitated by the retention of a proper fastener in base 10.

Positioning cutouts 28, 30 on substantially diametrically opposite sides of hole 22 and thus securing loop 14 on diametrically opposite sides of hole 22 and a fastener inserted therein reduces the potential for base 12 to be pulled over the fastener from angular forces exerted against loop 14. Lighter material can be used for anchor 10 than for designs having a larger lever arm for force exerted against the fastener, reducing the cost to manufacture anchor 10 compared to designs requiring more material to provide the same sturdiness in use.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An automobile tether anchor comprising:
   a base including a peripheral edge;
   said base defining a hole for receiving a fastener;
   first and second cutouts in said base on opposite sides of said hole, each said cutout having an opening thereto in said edge; and
   a loop spanning said base and having end segments secured in said cutouts, said end segments having distal ends and enlargements on said distal ends greater in diameter than said cutouts.

2. The tether anchor of claim 1, said enlargements extending beyond said edge.

3. An automobile tether anchor comprising:
   a base including a peripheral edge;
   said base defining a hole for receiving a fastener;
   first and second cutouts in said base on opposite sides of said bolt each said cutout having an opening thereto in said edge; and
   a loop spanning said base and having end segments secured in said cutouts, said end segments eat having a flattened area defining minor diameters of said end segments.

4. The tether anchor of claim 3, said end segments having distal ends and enlargements on said distal ends greater in diameter than said cutouts.

5. The tether anchor of claim 4, said enlargements extending beyond said edge.

6. An automobile tether anchor comprising:
   a base including a peripheral edge;
   said base defining a hole for receiving a fastener;
   first and second cutouts in said base on opposite sides of said hole, each said cutout having an opening thereto in said edge; and
   a loop spanning said base and having end segments seared in said cutouts, said base being cupped having a platform and a surrounding side, with said edge spaced from said platform by said side.

7. The tether anchor of claim 6, said hole including a tapered lead in surface.

8. The tether anchor of claim 4, said hole including a cylinder extending away from said tapered lead in surface.

9. The tether anchor of claim 8, said cylinder having inwardly extending tabs.

10. An automobile tether anchor comprising:
    a base including a peripheral edge;
    said base defining a hole for receiving a fastener, said hole including a cylinder;
    first and second cutouts in said base on opposite sides of said hole, each said cutout having an opening thereto in said edge; and
    a loop spanning said base and having end segments secured in said cutouts.

11. The tether anchor of claim 10, said cylinder having inwardly extending tabs.

12. An automobile tether device for installation on a surface, said device comprising;
    a base including a platform and a depending side having a peripheral edge for engaging the surface;
    said platform defining a hole for receiving a fastener;
    first and second cutouts in said depending side of said base on opposite sides of said hole; and
    a loop spanning said base and having end segments seared in said cutouts, said end segments configured to frictionally engage the surface upon rotation of the loop relative to the base.

13. The tether device of claim 12, said ad segments having distal ends and enlargements on said distal ends greater in diameter than said cutouts.

14. The toter device of claim 13, said enlargements extending beyond said edge to frictionally engage the surface upon rotation of the loop relative to the base.

15. The tether device of claim 12, said end segments cast having a flattened area defining minor diameters of said end segments.

16. The tether device of claim 15, said ad segments having distal ends and enlargements on said distal aids greater in diameter than said cutouts.

17. The tether device of claim 16, said enlargements extending beyond said edge.

18. The tether device of claim 12, said hole including a tapered lead in surface.

19. The tether device of claim 18, said hole including a cylinder extending away from said tapered lead in surface.

20. The tether device of claim 19, said cylinder having inwardly extending tabs.

21. An anchor comprising:
    a base defining a hole for fictionally engaging a fastener inserted therein, said fastener extending through said hole in said base and being adapted for attachment to a mating member so as to rigidly secure said base to the member;
    a loop spanning said base and having end segments seared rotatably in said base on substantially diametrically opposite sides of said hole; and
    said end segments configured to provide selected resistance to rotation of said loop relative to said base.

* * * * *